(12) United States Patent
Niessner et al.

(10) Patent No.: US 11,183,818 B2
(45) Date of Patent: Nov. 23, 2021

(54) PRE-CHAMBER SPARK PLUG WITH ORIENTATED OPENINGS

(71) Applicant: Federal-Mogul Ignition GmbH, Neuhaus-Schierschnitz (DE)

(72) Inventors: Werner Niessner, Steinheim (DE); Matthias Blankmeister, Heiligenhaus (DE)

(73) Assignee: FEDERAL-MOGUL IGNITION GMBH, Neuhaus Schierschni (DE)

( * ) Notice: Subject to any disclaimer, the term of this patent is extended or adjusted under 35 U.S.C. 154(b) by 0 days.

(21) Appl. No.: 15/935,408

(22) Filed: Mar. 26, 2018

(65) Prior Publication Data

US 2018/0294624 A1 Oct. 11, 2018

(30) Foreign Application Priority Data

Apr. 10, 2017 (DE) ...................... 10 2017 107 728.6

(51) Int. Cl.
*H01T 13/08* (2006.01)
*F02B 19/12* (2006.01)
(Continued)

(52) U.S. Cl.
CPC .............. *H01T 13/08* (2013.01); *F02B 19/12* (2013.01); *H01T 13/06* (2013.01); *H01T 13/54* (2013.01); *H01T 21/02* (2013.01)

(58) Field of Classification Search
CPC ......... H01T 13/08; H01T 13/54; H01T 13/06; H01T 21/02; F02B 19/12
See application file for complete search history.

(56) References Cited

U.S. PATENT DOCUMENTS

| 1,983,445 A | * | 12/1934 | Erny | ...................... H01T 13/54 313/143 |
| 2,026,822 A | * | 1/1936 | Close | ..................... H01T 13/54 313/11.5 |

(Continued)

FOREIGN PATENT DOCUMENTS

| CA | 2826807 A1 | 8/2012 |
| DE | 3148296 A1 | 9/1982 |

(Continued)

OTHER PUBLICATIONS

Office action issued by the German Patent and Trademark Office for application No. 10 2017 107 728.6 dated Jan. 31, 2019.

*Primary Examiner* — Phutthiwat Wongwian
*Assistant Examiner* — Susan E Scharpf
(74) *Attorney, Agent, or Firm* — Reising Ethington, P.C.

(57) ABSTRACT

A prechamber spark plug for an internal combustion engine with the following features: a body with an external thread at its front end for screwing the spark plug into the engine; the external thread has a center line and begins with a thread start at the front end; the body has a passage in which an insulator is fastened and a center electrode protrudes from the front end of this insulator; at the front end of the body, a prechamber-forming cap is provided, which delimits a prechamber and shields the center electrode from a combustion chamber of the engine after the spark plug has been installed in the engine; the cap has at least one opening, which has a predefined orientation in relation to the thread start and is oriented obliquely to the center line of the external thread so as to permit a gas exchange between the prechamber and the space outside the prechamber.

10 Claims, 4 Drawing Sheets

Figure 1:
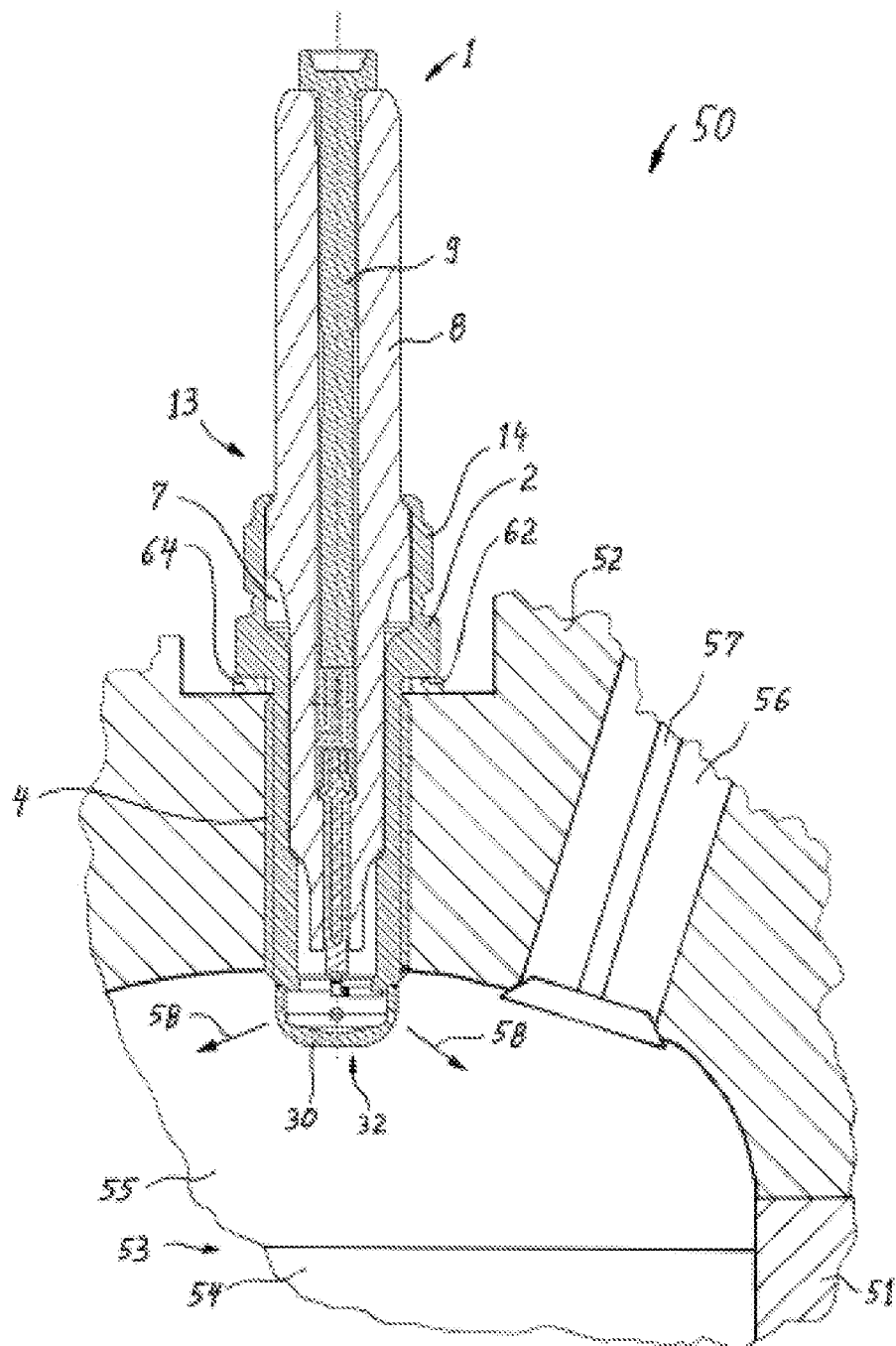

(51) Int. Cl.
*H01T 21/02* (2006.01)
*H01T 13/06* (2006.01)
*H01T 13/54* (2006.01)

(56) References Cited

U.S. PATENT DOCUMENTS

| | | | | |
|---|---|---|---|---|
| 2,047,575 | A * | 7/1936 | Burtnett | H01T 13/54 313/143 |
| 2,652,043 | A * | 9/1953 | Johnson | H01T 13/467 313/140 |
| 2,687,712 | A * | 8/1954 | Wright | H01T 13/54 313/11.5 |
| 4,119,065 | A * | 10/1978 | Noguchi | F02B 19/1066 123/262 |
| 4,124,003 | A * | 11/1978 | Abe | F02B 17/00 123/169 EL |
| 4,128,081 | A * | 12/1978 | Noguchi | F02B 19/12 123/262 |
| 4,188,932 | A * | 2/1980 | Konishi | F02B 19/12 123/260 |
| 4,416,228 | A * | 11/1983 | Benedikt | F02B 19/12 123/268 |
| 4,646,695 | A * | 3/1987 | Blackburn | F02B 19/12 123/256 |
| 4,892,070 | A * | 1/1990 | Kuhnert | H01T 13/54 123/274 |
| 4,914,343 | A * | 4/1990 | Kagawa | H01T 13/467 313/139 |
| 5,430,346 | A * | 7/1995 | Johnson | H01T 13/32 313/139 |
| 5,741,963 | A | 4/1998 | Nakatani et al. | |
| 6,013,973 | A * | 1/2000 | Sato | H01T 13/54 313/140 |
| 6,305,929 | B1 | 10/2001 | Chung et al. | |
| 6,310,430 | B1 * | 10/2001 | Moriya | H01T 13/20 123/169 EL |
| 6,460,506 | B1 * | 10/2002 | Nevinger | H01T 13/54 123/260 |
| 7,243,634 | B2 * | 7/2007 | Tourteaux | F02B 19/12 123/261 |
| 7,628,130 | B2 | 12/2009 | Johng | |
| 7,659,655 | B2 * | 2/2010 | Tozzi | F02B 19/12 313/143 |
| 7,901,262 | B2 | 3/2011 | Satoh | |
| 7,922,551 | B2 * | 4/2011 | Tozzi | H01T 13/467 445/7 |
| 8,104,444 | B2 * | 1/2012 | Schultz | F02P 9/007 123/143 B |
| 8,212,462 | B2 | 7/2012 | Kato | |
| 8,388,395 | B2 | 3/2013 | Nakamura et al. | |
| 8,517,786 | B2 | 8/2013 | Musasa et al. | |
| 8,593,046 | B2 | 11/2013 | Kodama et al. | |
| 8,839,762 | B1 | 9/2014 | Chiera et al. | |
| 8,890,396 | B2 | 11/2014 | Ernst et al. | |
| 8,896,192 | B2 * | 11/2014 | Kato | H01T 13/32 313/141 |
| 9,093,823 | B2 * | 7/2015 | Sakakura | H01T 13/32 |
| 9,160,148 | B2 | 10/2015 | Kyuno | |
| 9,172,216 | B2 | 10/2015 | Ernst | |
| 9,172,217 | B2 | 10/2015 | Hampson et al. | |
| 9,562,510 | B2 | 2/2017 | Niessner et al. | |
| 10,109,986 | B2 * | 10/2018 | Niessner | H01T 13/08 |
| 10,641,159 | B2 * | 5/2020 | Graham | F02B 19/08 123/260 |
| 2002/0180326 | A1 * | 12/2002 | Francesconi | H01T 13/467 313/140 |
| 2007/0119409 | A1 * | 5/2007 | Johng | H01T 13/54 123/267 |
| 2007/0236122 | A1 * | 10/2007 | Borror | H01T 13/54 313/118 |
| 2008/0196689 | A1 * | 8/2008 | Gagliano | F02B 19/1014 123/266 |
| 2009/0066210 | A1 * | 3/2009 | Chang | H01T 13/467 313/141 |
| 2012/0240890 | A1 * | 9/2012 | Johng | F02P 13/00 123/169 P |
| 2012/0242215 | A1 * | 9/2012 | Hwang | H01T 13/54 313/143 |
| 2014/0102404 | A1 * | 4/2014 | Sotiropoulou | F02B 19/18 123/260 |
| 2014/0196684 | A1 * | 7/2014 | Kraus | F02B 19/12 123/253 |
| 2014/0225497 | A1 * | 8/2014 | Woerner | F02P 23/04 313/143 |
| 2014/0261296 | A1 * | 9/2014 | Sotiropoulou | F02B 19/12 123/260 |
| 2016/0031268 | A1 | 2/2016 | Hiraiwa | |
| 2016/0047295 | A1 * | 2/2016 | Sotiropoulou | F02B 19/1014 123/253 |
| 2016/0053671 | A1 * | 2/2016 | Sotiropoulou | F02B 19/08 123/260 |
| 2017/0004771 | A1 | 1/2017 | Lee et al. | |
| 2017/0005457 | A1 * | 1/2017 | Niessner | H01T 13/32 |
| 2017/0104316 | A1 * | 4/2017 | Niessner | H01T 13/32 |
| 2018/0087447 | A1 * | 3/2018 | Graham | F02M 61/168 |
| 2018/0294626 | A1 * | 10/2018 | Niessner | H01T 13/32 |

FOREIGN PATENT DOCUMENTS

| | | |
|---|---|---|
| DE | 3241697 A1 | 5/1984 |
| DE | 10144976 A1 | 4/2003 |
| DE | 102006062737 A1 | 1/2008 |
| DE | 102015110601 B3 | 1/2017 |
| EP | 2678907 A1 | 1/2014 |
| JP | 2011214492 A | 10/2011 |
| JP | 2013073709 A | 4/2013 |

* cited by examiner

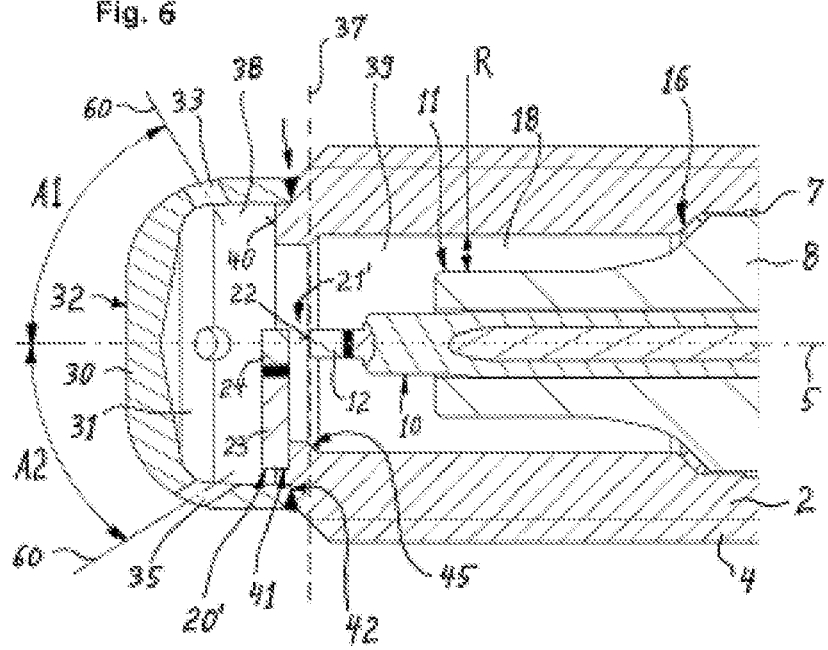
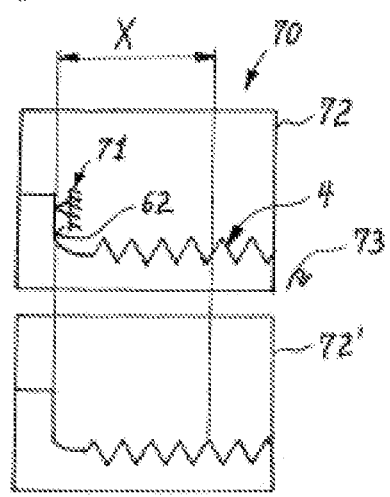
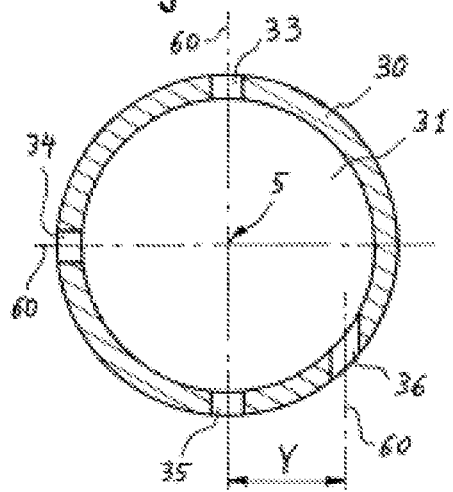

PRE-CHAMBER SPARK PLUG WITH ORIENTATED OPENINGS

REFERENCE TO RELATED APPLICATIONS

This application claims the benefit of German Application No. 10 2017 107 728.6, filed on Apr. 10, 2017, the contents of which are hereby incorporated by reference in their entirety.

FIELD

The present invention is generally related to pre-chamber spark plugs with orientated openings.

BACKGROUND

To date, prechamber-forming caps in prechamber spark plugs have been placed onto the front end of the body in such a way that the openings provided in the prechamber-forming cap have had a random orientation relative to the thread start. The ignition torches that come out of the openings during an ignition event are thus likewise oriented randomly in the combustion chamber of the internal combustion engine.

DE 10 2006 062,737 B4 discloses a method for producing a spark plug that is not of this generic type and does not have a prechamber, in which a defined position of a body electrode relative to the thread start of the thread for screwing in the spark plug is achieved in that the external sealing seat of the body is immobilized against a stop, the thread profile in a measurement window is adjusted by means of a rotating movement, and the body electrode is welded.

SUMMARY

According to one object of the present design, there is provided a prechamber spark plug of the type mentioned above, a set of such prechamber spark plugs, and a method for producing the same, rendering it possible to improve the ignition in the combustion chamber of the internal combustion engine.

The object may be attained by a prechamber spark plug with the features of claim 1 and a set of prechamber spark plugs with the features of claim 10. The object may also be attained by an internal combustion engine with the features of claim 11 and a method for producing the prechamber spark plug with the features of claim 12. Advantageous modifications are the subject of the dependent claims.

The prechamber spark plug according to the present design may have a body with an external thread on its front end for screwing the prechamber spark plug into the internal combustion engine. The external thread has a center line and begins with a thread start at the front end. The body has a passage in which an insulator is fastened and a center electrode protrudes from the front end of this insulator. The front end of the insulator is also referred to as the "insulator foot." The insulator can surround an internal conductor that is connected to the center electrode in an electrically conductive fashion. The back end of the prechamber spark plug or of the body is facing away from the front end. The insulator can protrude from the body there.

The prechamber spark plug can include one ground electrode, which is connected to the body in an electrically conductive fashion and forms a spark gap with the center electrode. At the front end of the body, a prechamber-forming cap is provided, which delimits a prechamber. The cap shields the center electrode—and if present, also the ground electrode—from the combustion chamber and has at least one opening, which is oriented obliquely to the center line of the external thread and permits a gas exchange between the prechamber and the space outside the prechamber, namely the combustion chamber of the internal combustion engine. The opening has a predefined orientation in relation to the thread start. It can be a passive prechamber spark plug in which the prechamber is supplied with fuel exclusively from the combustion chamber of the internal combustion engine, namely via the at least one opening in the cap. In particular, the passive prechamber spark plug does not contain any fuel supply conduits that supply additional fuel directly to the prechamber.

The internal combustion engine according to the present design has a plurality of combustion chambers, into each of which a respective conduit feeds and a prechamber spark plug with a prechamber-forming cap protrudes. The internal combustion engine can have a housing with a plurality of cylinders. The housing can include an engine block and a cylinder head. The conduit can be an intake duct or exhaust duct situated in the cylinder head. The cylinder has a piston, which is able to move in the housing and delimits a combustion chamber contained in the housing. The volume of the combustion chamber changes as the piston moves. The volume of the combustion chamber when the piston is at top dead center is referred to as the "compressed volume." The internal combustion engine is equipped with the required number of prechamber spark plugs according to the present design so that in all of the prechamber spark plugs, the opening in the cap has the same orientation in relation to the conduit. The set of prechamber spark plugs according to the present design includes the number of prechamber spark plugs required for an internal combustion engine and can in particular be used especially when the internal combustion engine is being repaired and the prechamber spark plugs must be replaced. The set includes a plurality of prechamber spark plugs according to the present design and in all of the prechamber spark plugs of the set, the opening has the same orientation in relation to the thread start.

In the method according to the present application for producing the prechamber spark plug, the external sealing seat of the body adjacent to the external thread is established as a basis and the thread profile of the external thread is adjusted by means of a rotating movement of the body around the center line. An auxiliary device can be used for this, in particular an adjusting device equipped with an optical measuring system, in which the thread profile can be observed transversely to the center line, particularly in a measurement window. When the thread profile of the external thread is brought into a predefined orientation through the rotating movement of the body, for example when the tip of a thread is spaced a defined distance apart from the external sealing seat, then the thread start automatically has a predefined position in the circumference direction of the body. The establishment of the external sealing seat as a basis and the determination of the orientation of the thread profile can be carried out entirely or partially by optical means. In order to establish the external sealing seat as a basis, the external sealing seat can be placed against a stop. The stop and/or the measurement window can be part of the adjusting device. After the adjustment of the thread profile, the cap is placed with its opening in a predefined position onto the front end of the body and welded to it. This achieves a predefined orientation of the opening in the cap in relation to the thread start, and after the prechamber spark plug has been installed in the internal combustion engine, the opening always has the same orientation in relation to the conduit.

The present design may enjoy the following advantages:

In all of the cylinders of an internal combustion engine, a defined orientation of the ignition torch or flame jet—which shoots out from the opening during the ignition event—in the combustion chamber is achieved. The direction of the opening is adapted to the combustion chamber and the conditions prevailing therein. This improves the ignition of a lean mixture.

In gasoline-powered spark-ignition engines, the present design can improve lean-burn operation and enable a reliable, large-volume ignition in the combustion chamber by means of ignition torches or flame jets that shoot out from the openings in the cap in a targeted fashion, in particular even when the exhaust recirculation rate is relatively high.

The piston displacement of the cylinder of the internal combustion engine according to the present design can lie in the range from 300 cm$^3$ to 800 cm$^3$, in particular from 300 cm$^3$ to 500 cm$^3$. It has surprisingly turned out that especially with a piston displacement of this kind, a particularly good ignition can be achieved if the total volume of the prechamber is chosen to be relatively large and makes up at least 0.65%, in particular 0.65% to 1.9% of the compressed volume of the combustion chamber. With a compressed volume of the combustion chamber in the range from 30 cm$^3$ to 100 cm$^3$, in particular from 50 cm$^3$ to 80 cm$^3$, this can be achieved with a total volume of the prechamber in the range from 0.2 cm$^3$ to 1 cm$^3$, in particular from 0.3 cm$^3$ to 0.8 cm$^3$.

In another embodiment, the opening, the ground electrode, and the thread start can have a predefined orientation to one another, which is the same in all of the prechamber spark plugs of the set and of the internal combustion engine. In particular, the center line of the opening, especially the center line of each of the openings in a cap, can intersect the center line of the external thread. This can produce an essentially swirl-free, high-turbulence flow in the prechamber, thus making it possible to ensure a good flushing of the prechamber and a reliable ignition. The high turbulence or high "turbulent kinetic energy" also ensures an acceleration of the combustion. The angle between the center line of the opening and the center line of the external thread can be from 30° to 80°, in particular from 45° to 60°. The cap can have 3 to 9 openings, in particular 4 to 6 openings.

During production, the external sealing seat and the external thread can be produced on the body first before the adjustment and welding of the cap. Then the external sealing seat is established as a basis a first time, for example by placing it against a stop, and the thread profile of the external thread is adjusted through a rotating movement of the body around the center line of the external thread. After the initial adjustment, at least one groove is milled at a predefined position into an end surface of the body extending transversely to the center line or into a step that is formed onto the body. A ground electrode is inserted into the groove and welded to the body. Then, the insulator, in particular already prefabricated with the center electrode and internal conductor, is inserted into the passage in the body and fastened there in an intrinsically known way. After the insertion and fastening of the insulator, the external sealing seat of the body is established as a basis a second time and the thread profile of the external thread is adjusted through a rotating movement of the body in order to be able to affix the cap to the front end of the body with the opening of the cap in a predefined position. If necessary, the spacing of the ground electrode from the center electrode in the region of the spark gap can be adjusted before the cap is affixed.

In the body, an annular seat surface for the insulator can be provided at which the passage narrows, viewed from the back end to the front end. The front end of the insulator, i.e. the insulator foot, protrudes forward beyond the seat surface into the prechamber and is spaced apart from the body by a spacing distance of at least 1.2 mm extending in the circumference direction. The spacing distance between the front end of the insulator and the prechamber wall can in particular be 1.4 mm or more. When viewed from the back to the front, the passage can narrow at a point situated between the annular seat surface for the insulator and the fastening point of the ground electrode. The constriction situated between the annular seat surface for the insulator and the ground electrode, in particular the fastening point of the ground electrode on the body, can enable an improved fastening of the ground electrode. The ground electrode can contact the body along more of its length. It is thus possible to lengthen the weld between the ground electrode and the body. The constriction can in particular protrude into the prechamber "like a balcony" behind the ground electrode. The passage can have its smallest free cross-section at the constriction that supports the ground electrode. The passage of the body can thus narrow at two points; it is also possible for the passage to widen between the two constrictions. The passage—viewed from the back to the front—can widen at a point situated between the annular seat surface for the insulator and the front end of the insulator, i.e. in the vicinity of the insulator foot. In the vicinity of the insulator foot, an open annular space can be produced, which is large enough to ensure a good flushing of the prechamber.

In another embodiment, the prechamber can be divided by an imaginary dividing plane into a front part and a back part. The dividing plane extends perpendicular to the center line of the external thread and is positioned at an end surface of the center electrode that protrudes out from the insulator. The front part of the prechamber is situated on the side of the dividing plane oriented toward the front end of the spark plug and the back part of the prechamber is situated on the side of the dividing plane oriented toward the back end of the spark plug. The back part of the prechamber is situated inside the spark plug, in particular inside the body. Since the dividing plane only conceptually divides the prechamber into two parts, they remain connected to each other at the dividing plane. Apart from this connection of the back part of the prechamber to the front part of the prechamber at the dividing plane, the back part of the prechamber is closed in a gastight fashion. "Gastight" means that aside from the gas exchange with the front part of the prechamber taking place at the dividing plane, no gases can escape from the back part of the prechamber during operation. The volume of the back part of the prechamber is greater than the volume of the front part of the prechamber. The volume of the back part of the prechamber can be greater than the volume of the front part of the prechamber by a factor of 1.5 to 2.0, in particular by a factor of 1.6 to 1.7. This can achieve an enlarged space downstream of the spark gap into which residual gases from the previous power stroke of the engine can be displaced during a compression stroke. Thanks to this enlarged storage space for residual gases, a practically undiluted fresh fuel/air mixture can be present at the ignition gap between the center electrode and the ground electrode, thus enabling improved ignition by the sparks.

DRAWINGS

Figure 2:
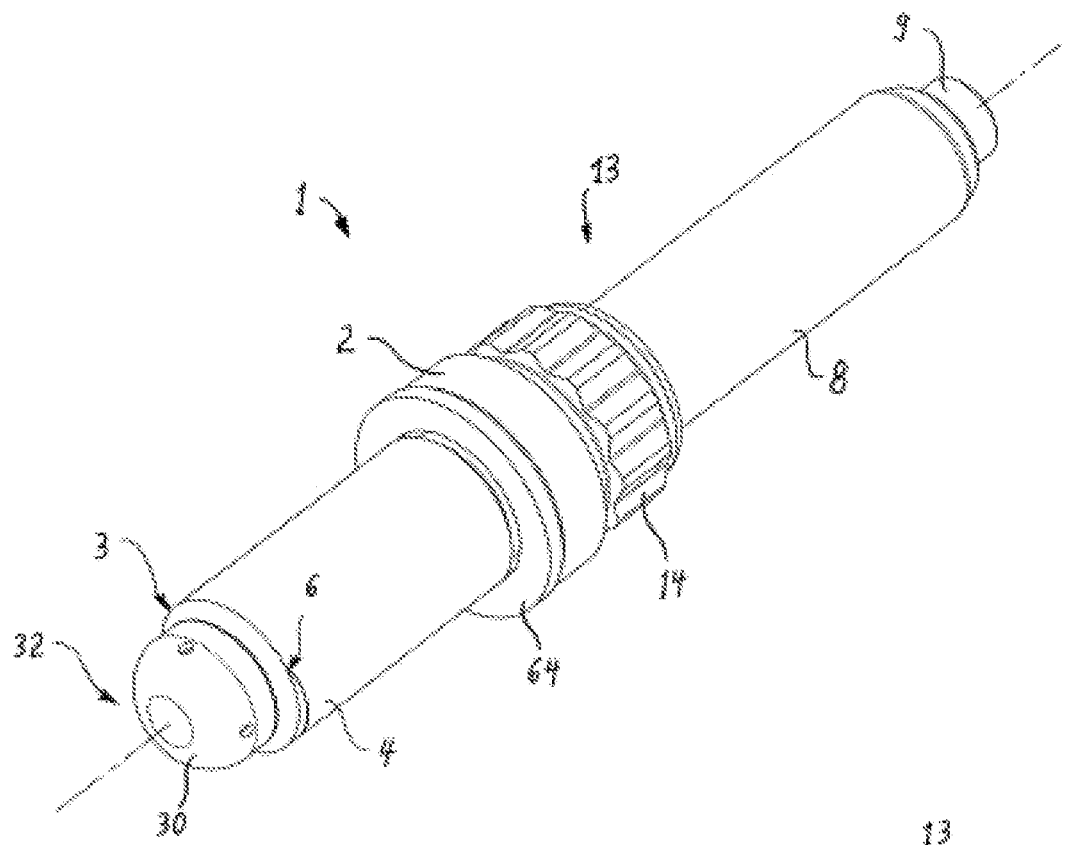
Figure 3:
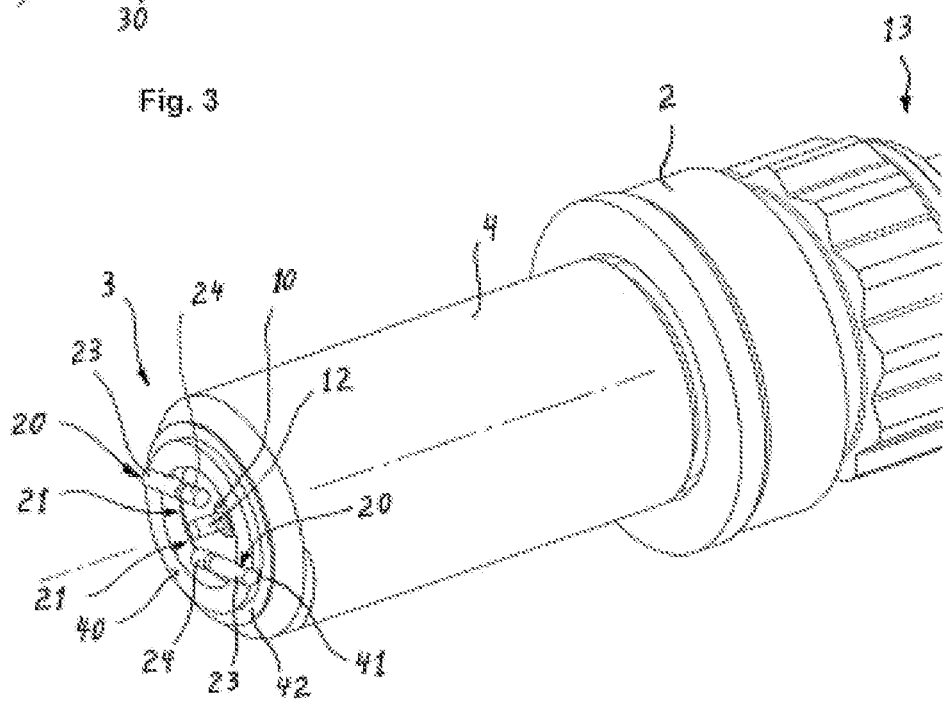
Figure 4:
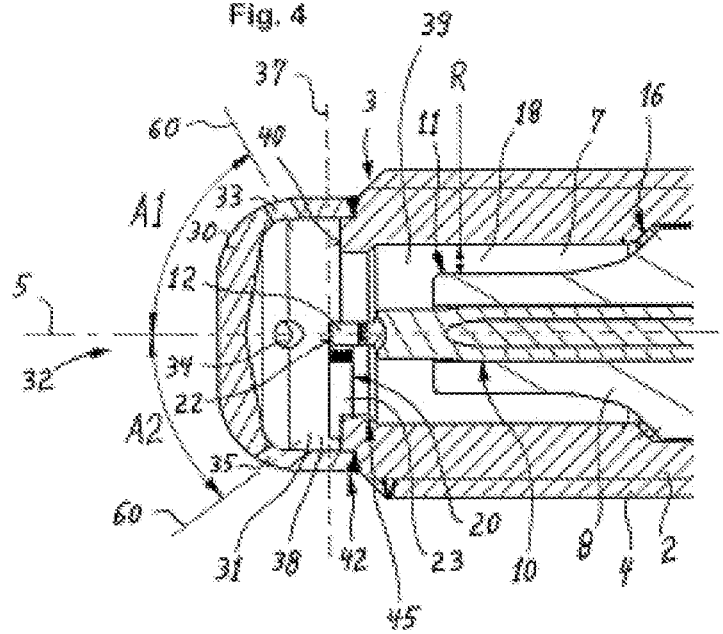
Figure 5:
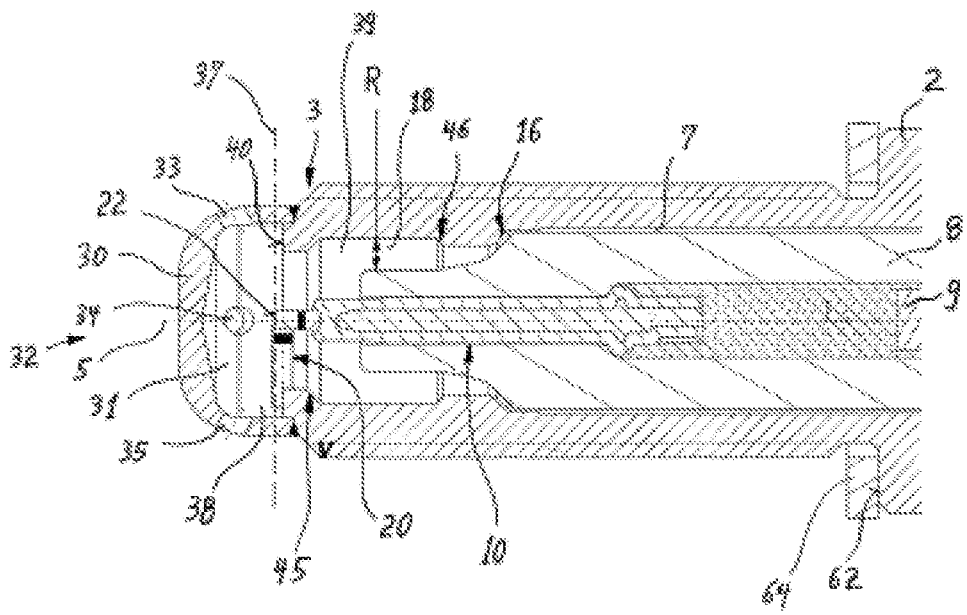

Other advantages and features of the present design ensue from the following description of some exemplary embodiments in connection with the figures. In the drawings:

FIG. 1 is a section through a part of an internal combustion engine according to the present design, which is equipped with a prechamber spark plug, FIG. 2 is a perspective view of the prechamber spark plug from FIG. 1, FIG. 3 shows the region of the front end of the prechamber spark plug from FIG. 2 with the cap removed, FIG. 4 shows an enlarged longitudinal section through the region of the front end of the prechamber spark plug from FIG. 1, FIG. 5 shows a view similar to FIG. 4 of a variant of the prechamber spark plug, FIG. 6 shows a view similar to FIG. 4 of another variant of the prechamber spark plug, FIG. 7 shows a schematic depiction of an adjusting procedure of an external thread of a prechamber spark plug according to the present design, FIG. 8 shows a cross-section through a variant of a cap for a prechamber spark plug according to the present design.

DESCRIPTION

FIGS. 1 through 6 show a prechamber spark plug 1 with a metallic body 2 and an external thread 4 situated at its front end 3. The external thread 4 has a center line 5 and begins with a thread start 6 at the front end 3. The external thread 4 can be an M12 thread. The beginning of a thread turn of the external thread 4 schematically depicted in FIGS. 2 and 3 is referred to as a thread start 6. The body 2 has a passage 7 in which an insulator 8 is fastened in an intrinsically known way. The insulator 8 encloses an internal conductor 9, which is connected to a center electrode 10. At the front end 11 of the insulator 8, the center electrode 10 protrudes out from it and is provided with a reinforcing component 12 there. At the back end 13 of the prechamber spark plug 1, the insulator 8 protrudes out from the body 2. The body 2 is provided with a hexagonal or bi-hex fitting 14 to permit it to be engaged by a screwing tool. An annular seat surface 16 for the insulator 8 is provided in the passage 7. Viewed from the back end 13 to the front end 3, the passage 7 narrows at the annular seat surface 16. A sealing ring is positioned between the seat surface 16 and a matching annular shoulder of the insulator 8. The front end 11 of the insulator 8 is embodied as an insulator foot and protrudes beyond the seat surface 16 in the direction of the front end 3 of the body. At least at the front end 11, the insulator foot is spaced apart from the inner wall of the passage 7 by a spacing distance R of approximately 1.4 mm extending in the circumference direction. The front end 11 of the insulator 8 is thus surrounded by an annular gap 18 with a width R, which can receive residual gases during a compression stroke.

The prechamber spark plug 1 according to FIGS. 1 through 4, and the variant shown in FIG. 5 has two ground electrodes 20 extending in a straight line, each forming a respective spark gap 21 with the circumference surface of the center electrode 10. In the variant shown in FIG. 6, only one ground electrode 20' is provided, which forms a spark gap 21' with the end surface 22 of the center electrode 10. Each of the ground electrodes 20, 20' is embodied of two parts, a supporting component 23 and a reinforcing component 24, and extends transversely to the center line 5, in particular perpendicular to it. The reinforcing component 24 is composed of a precious metal alloy, in particular a platinum and/or iridium alloy. The supporting component 23 is composed of a nickel-based alloy. The supporting component 23 and reinforcing component 24 are each embodied in the form of a circular cylinder and are made out of a wire. Their diameter can be between 0.5 mm and 1.2 mm. The reinforcing component 24 is welded to the end surface of the supporting component 23, in particular by means of laser welding.

The spark gap 21 or 21' is delimited by the circumference surface of the reinforcing component 24. The distance between the reinforcing component 24 and the reinforcing component 12 there can total 0.7 mm to 0.9 mm. The ground electrodes 20 can therefore be produced very simply, making it possible to reduce the consumption of valuable precious metal. The ground electrodes 20 can be prefabricated in large quantities and then used in different variants of prechamber spark plugs 1, in particular see FIGS. 4 through 6.

At the front end 3, the body 2 has a cap 30 welded to it, which delimits a prechamber 31 and shields the electrodes 10, 20 and the spark gap 21. The cap 30 protrudes beyond the front end 3 of the body 2 and delimits the front end 32 of the prechamber spark plug 1. The cap 30 has a plurality of openings 33, 34, 35 and 36; see FIG. 8, which extend obliquely to the center line 5 and permit a gas exchange between the prechamber 31 and the space outside the prechamber 31. The diameter of the circular openings 33, 34, 35, 36 can be 0.8 mm and 1.4 mm. An imaginary dividing plane, which extends perpendicular to the center line 5 and is indicated by the dashed line 37 in FIGS. 4 through 6, can be situated at the front end surface 22 of the center electrode 10. The dividing plane 37 divides the prechamber 31 into a front part 38 and a back part 39. The front part 38 is situated on the side of the dividing plane 37 oriented toward the front end 32 of the prechamber spark plug 1, and the back part 39 of the prechamber 31 is situated on the side of the dividing plane 37 oriented toward the back end 13. The back part 39 is situated entirely inside the prechamber spark plug 1. The front part 38 and the back part 39 are connected to each other at the dividing plane 37 so that a gas exchange between the front part 38 and the back part 39 can take place via the dividing plane 37. Apart from this connection to the front part 38, the back part 39 is closed in a gastight fashion. All of the openings 33, 34, 35, 36 feed into the front part 38. A total volume Vv+Vh of the prechamber 31 is composed of the sum of a volume Vv of the front part 38 and a volume Vh of the back part 39 of the prechamber 31. In the region of the openings 33, 34, 35 and 36, the front volume Vv extends until the outer surface of the cap 30 so that the front volume Vv also comprises the volumes of the openings 33, 34, 35, 36 inside the wall of the cap 30. The volume Vh of the back part 39 is greater than the volume Vv of the front part 38, in particular by a factor of 1.6 to 1.7.

At the front end 3, the body 2 has an end surface 40 on which a fastening point of the ground electrode 20 is provided. For each ground electrode 20, a groove 41 is provided in the end surface 40 at the fastening point; the supporting component 23 sits in this groove 41 and is welded to the body 2, in particular by means of resistance welding. In an embodiment that is not shown, the ground electrode 20 can also be welded to the end surface 40 without a groove 41. At the front end 3, the body 2 has a step 42 extending in the circumference direction, which faces radially outward. The cap 30 is placed onto this step 42 and is welded to the body 2 there. Alternatively, in an embodiment that is not shown, instead of an external step 42, the front end 3 can have an internal step formed into it, which extends transversely to the center line 5 and to which the supporting component 23 is welded. In this alternative, the cap 30 is welded to the end surface 40 of the body 2. Depending on the embodiment, the end surface 40 and/or the ground electrode 20 can be positioned in the back part 39 of the prechamber 31; see FIGS. 4 and 5, or, in the front part 38, see FIG. 6.

Viewed from the back end 13 to the front end 3, the passage 7 of the body 2 narrows at a point 45. The constriction 45 is situated between the seat surface 16 and the ground electrode 20. At the constriction 45, the body 2 protrudes like a balcony into the prechamber 31. This improves the fastening of the ground electrode 20. As shown in FIG. 5, when viewed from back to front, the passage 7 can widen at a point 46, which is situated between the constriction formed by the seat surface 16 and the constriction 45. The annular seat surface 16 can thus widen out so that the insulator 8 can be better supported on the body 2. The widening 46 can also increase the width R of the annular gap 18. This can be advantageous for permitting better flushing of residual gases out of the annular gap 18 and for achieving a correspondingly large volume Vh of the back part 39 of the prechamber 31, which offers enough space in the back part to accommodate any residual gases still remaining.

FIG. 1 shows how the prechamber spark plug 1 is screwed with its external thread 4 into an internal combustion engine 50. The internal combustion engine 50 has a housing, which includes an engine block 51 and a cylinder head 52 and which has a plurality of cylinders 53, one of which is partially depicted in FIG. 1. The cylinder 53 has a piston 54 that is able to move in the engine block 51. The engine block 51, the cylinder head 52, and the piston 54 delimit a combustion chamber 55 whose volume changes as the piston 54 moves. The piston displacement of the cylinder 53 can lie in the range from 300 cm$^3$ to 500 cm$^3$. The combustion chamber 55 is fed by a conduit 56, which can be an intake duct or an exhaust duct. The conduit 56 can be closed by a valve 57. Internal combustion engines 50 of this kind and the way in which they function are known in and of themselves. When the piston 54 is at its top dead center, the combustion chamber 55 has its smallest volume, which is referred to as the "compressed volume." The total volume Vv+Vh of the prechamber 31 lies in the range from 0.7% to 1% of the compressed volume Vc. The volume Vc is from 50 cm$^3$ to 80 cm$^3$ while the total volume Vv+Vh lies in the range from 0.3 cm$^3$ to 0.8 cm$^3$.

The cap 30 shields the center electrode 10 and the ground electrode 20 from the combustion chamber 55. The openings 33, 34, 35 and 36 permit a gas exchange between the combustion chamber 55 and the prechamber 31. When the piston 54 moves upward during the compression stroke, fresh fuel/air mixture is pushed from the combustion chamber 55 through the openings 33, 34, 35 and 36 into the prechamber 31. Residual gases remaining in the prechamber 31 are displaced into the back part 39 so that fresh mixture travels to the spark gap 21. Each of the openings 33, 34, 35 and 36 has a center line 60, which extends along the direction in which the openings 33, 34, 35 and 36 extend, and intersects with the wall of the cap 30. The center lines 60 of the openings 33, 34 and 35 each intersect with the center line 5 of the external thread 4. The center line 60 of the opening 33 is oriented at an angle A1 relative to the center line 5. and the center line 60 of the opening 35 is oriented at an angle A2 relative to the center line 5. The angles A1 and A2 are different and can be from 45° to 60°. The center line 60 of the opening 36, see FIG. 8, extends askew to the center line 5 and does not intersect it. In the depiction in FIG. 8, the center line 5 of the external thread 4 extends perpendicular to the plane of the drawing at the intersecting point of the center lines 60 of the openings 33 and 34. The center line 60 of the opening 36 is spaced apart from the center line 5 by a distance Y. Instead of the exemplary embodiment shown in FIG. 8, it is also possible for the center lines of all of the openings in the cap 30 to intersect with the center line 5 of the external thread 4 in order to enable a swirl-free flow of the fresh fuel/air mixture into the prechamber 31.

The openings 33, 34, 35 and 36 each have a predefined position in the circumference direction of the body 2 and have a predefined orientation relative to the thread start 6. The predefined orientation is the same in all of the prechamber spark plugs 1 of the same internal combustion engine 50 in order to achieve the same conditions in each of its cylinders 53. The openings 33, 34, 35 and 36 have the same orientation relative to the conduit 56 and the valve 57. The ignition torches, which shoot out of the openings 33, 34, 35, 36 into the combustion chamber 55 after the ignition of the fuel/air mixture in the prechamber 31 and which are indicated by the arrows 58 in FIG. 1, therefore likewise have a predefined orientation in the combustion chamber 55. An ignition torch 58 can, for example, point definitely in the direction of a valve 57 or can point into a region between two valves 57. This can improve the ignition of a lean fuel/air mixture in the combustion chamber 55.

Adjacent to the external thread 4 at the rear end 13 thereof, the body 2 has a collar with an external sealing seat 62, which limits how far the prechamber spark plug 1 can be screwed into the internal combustion engine 50. The external sealing seat 62 is associated with a sealing ring 64 for sealing the combustion chamber 55.

When the prechamber spark plug 1 is produced, first the body 2 is produced, with its passage 7, the external thread 4, the external sealing seat 62, and the bi-hex fitting 14. Then, the external sealing seat 52 is placed against a stop 71 (schematically depicted in FIG. 7) of an adjusting device 70. The stop 71 can be mechanical or optical. The adjusting device 70 has an optical measuring system with a measurement window 72 in which a section of the thread profile of the external thread 4 can be observed transversely to the center line 5. The resulting image is schematically depicted in the measurement window 72 in FIG. 7. Then the body 2 is rotated around its center line 5. The rotating movement is indicated by the arrow 73 in FIG. 7. The rotating movement 73 is used to adjust the thread profile of the external thread 4 so that a tip of a thread has a predefined distance X from the stop 71. For illustration purposes, the resulting image of the adjusted thread profile of the external thread 4 is schematically depicted as the measurement window 72' underneath the measurement window 72. The thread start 6 is then located at a definite position along the circumference of the body, which is produced as a function of the selected dimension X. After the adjustment of the external thread 4, the required number of grooves 41 is produced at the respectively desired position by milling. Then, the prefabricated ground electrodes 20 and 20' are each inserted into the respective groove 41 and welded to the body 2. The adjustment of the external thread 4 in the measurement window 72 ensures that the grooves 41 have the same orientation relative to the thread start 6 in each prechamber spark plug 1. Then the insulator 8 is inserted into the passage 7 and is fastened in a gastight fashion in an intrinsically known way; the insulator 8 is already prefabricated in an intrinsically known way with the center electrode 10 and the internal conductor 9. Then, the electrode spacing in the region of the spark gap 21, 21' can be set to the desired dimension by slightly bending the supporting component 23. Then, the external sealing seat 62 of the body 2 is once again placed against the stop 71, and the thread profile of the external thread 4 is once again adjusted to the dimension X in the above-described way through the rotating movement 73. Then, the cap 30 with the openings 33, 34, 35 and 36 is placed in the desired orientation onto the front end 3 of the body 2 and welded thereto. The openings 33, 34, 35 and 36 therefore have a predefined orientation in relation to the thread start 6 and the ground electrode 20, which is the same in all of the prechamber spark plugs 1. If the prechamber spark plugs 1 that have been produced in this way are then screwed into the cylinder head 53 [sic] with the prescribed tightening torque, this ensures that the openings 33, 34, 35 and 36 have the same orientation in all of the prechamber spark plugs 1 of the internal combustion engine 50 so that in all of the cylinders 53, the ignition torches 58 likewise have the desired orientation in the combustion chamber 55, which is suitable for a good ignition.

List of Reference Numerals

| | |
|---|---|
| 1 | prechamber spark plug |
| 2 | body |
| 3 | front end |
| 4 | external thread |
| 5 | center line |
| 6 | thread start |
| 7 | passage |
| 8 | insulator |
| 9 | internal conductor |
| 10 | center electrode |
| 11 | front end |
| 12 | reinforcing component |
| 13 | back end |
| 14 | Bi-hex fitting |
| 16 | seat surface |
| 18 | annular gap |
| 20, 20' | ground electrode |
| 21, 21' | spark gap |
| 22 | end surface |
| 23 | supporting component |
| 24 | reinforcing component |
| 30 | cap |
| 31 | prechamber |
| 32 | front end |
| 33 | opening |
| 34 | opening |
| 35 | opening |
| 36 | opening |
| 37 | dividing plane |
| 38 | front part |
| 39 | back part |
| 40 | end surface |
| 41 | groove |
| 42 | step |
| 45 | constriction |
| 46 | widening |
| 50 | internal combustion engine |
| 51 | engine block |
| 52 | cylinder head |
| 53 | cylinder |
| 54 | piston |
| 55 | combustion chamber |
| 56 | conduit |
| 57 | valve |
| 58 | ignition torch |
| 60 | center line |
| 62 | external sealing seat |
| 64 | sealing ring |
| 70 | adjusting device |
| 71 | stop |
| 72, 72' | measurement window |
| 73 | rotating movement |
| A1, A2 | angle |
| R | spacing distance |
| Vc | compressed volume |
| Vh | back volume |
| Vv | front volume |
| X | spacing distance |
| Y | spacing distance |

The invention claimed is:

1. A prechamber spark plug for an internal combustion engine, comprising:

a body with an external thread at its front end for screwing the prechamber spark plug into the internal combustion engine;

the external thread has a center line and begins with a thread start at the front end, the thread start is located at a first circumferential position;

the body has a passage in which an insulator is fastened and a center electrode protrudes from the front end of the insulator;

at the front end of the body, a prechamber-forming cap is provided which delimits a prechamber and shields the center electrode from a combustion chamber of the internal combustion engine after the prechamber spark plug has been installed in the internal combustion engine, the prechamber-forming cap is welded to the front end of the body;

the cap has at least one opening, which is oriented obliquely to the center line of the external thread and permits a gas exchange between the prechamber and the space outside the prechamber, the opening is located at a second circumferential position, at least one ground electrode is connected to the body in an electrically conductive fashion and forms a spark gap with the center electrode, the ground electrode includes a supporting component and a reinforcing component that is made of a precious metal alloy and is attached to the supporting component, the supporting component and the reinforcing component are each embodied in the form of a circular cylinder, and the ground electrode is located at a third circumferential position, wherein the second circumferential position of the opening, the third circumferential position of the ground electrode, and the first circumferential position of the thread start have a predefined circumferential orientation in relation to one another.

2. The prechamber spark plug according to claim 1, wherein the body has an end surface extending transversely to the center line or has a step formed onto the body, which contains a groove into which the ground electrode is inserted.

3. The prechamber spark plug according to claim 1, wherein the cap has at least two openings whose orientation differs with regard to an angle and/or with regard to a spacing distance of their center lines relative to the center line of the external thread.

4. The prechamber spark plug according to claim 1, further comprising the following additional features:

an annular seat surface for the insulator is provided in the passage of the body, and an end surface is provided at an end of the passage of the body; and the passage narrows forward of the seat surface at the end surface, when viewed from the back end to the front end, and the ground electrode is connected to the end surface, with or without a groove, and extends in a straight line that is perpendicular to the center line.

5. The prechamber spark plug according to claim 4, wherein the front end of the insulator protrudes forward beyond the seat surface into the prechamber and is spaced apart from the body by a spacing distance of at least 1.2 mm extending in the circumference direction.

6. The prechamber spark plug according to claim 4, in which the passage, when viewed from the back to the front, narrows at a point that is a constriction situated forward of the annular seat surface for the insulator and rearward of the ground electrode.

7. The prechamber spark plug according to claim 1, wherein the passage, when viewed from the back to the front, widens at a point situated between the annular seat surface for the insulator and the front end of the insulator.

8. The prechamber spark plug according to claim 1, further comprising the following additional features:
   the prechamber can be divided into a front part and a back part by an imaginary dividing plane, which extends perpendicular to the center line of the external thread at the end surface of the center electrode that protrudes out from the insulator;
   the front part of the prechamber is situated on the side of the dividing plane oriented toward the front end of the prechamber spark plug;
   the back part of the prechamber is situated on the side of the dividing plane oriented toward the back end of the prechamber spark plug, is situated inside the prechamber spark plug, and, apart from its connection to the front part of the prechamber at the dividing plane, is closed in a gastight fashion; and
   the volume of the back part of the prechamber is greater than the volume of the front part of the prechamber.

9. A set of prechamber spark plugs for an internal combustion engine, the set of prechamber spark plugs comprises a plurality of prechamber spark plugs, each having a respective body with an external thread at its front end for screwing the prechamber spark plug into the internal combustion engine, at least one ground electrode connected to the body in an electrically conductive fashion, the ground electrode includes a supporting component and a reinforcing component that is made of a precious metal alloy and is attached to the supporting component, the supporting component and the reinforcing component are each embodied in the form of a circular cylinder, and a prechamber-forming cap; the body of each has a passage in which an insulator is fastened and a center electrode protrudes from a front end of the insulator; the external thread of each has a center line and begins at a thread start at the front end of the body, the thread start is located at a first circumferential position; at the front end of the body of each, the prechamber-forming cap delimits a prechamber and shields the center electrode from a combustion chamber of the internal combustion engine after the prechamber spark plug has been installed in the internal combustion engine, the prechamber-forming cap is welded to the front end of the body; and the cap of each has at least one opening respectively oriented obliquely relative to the center line of the external thread and permits a gas exchange between the prechamber and a space outside the prechamber, the opening is located at a second circumferential position, and the ground electrode is located at a third circumferential position, wherein for all of the prechamber spark plugs of the set, the second circumferential position of the opening, the third circumferential position of the ground electrode, and the first circumferential position of the thread start have a predefined circumferential orientation in relation to one another.

10. An internal combustion engine comprising a plurality of combustion chambers and the set of prechamber spark plugs of claim 9, into each combustion chamber, a respective conduit feeds and a prechamber spark plug from the set of prechamber spark plugs having a prechamber-forming cap protrudes, the prechamber-forming cap has at least one opening that connects the prechamber to the combustion chamber, wherein all of the prechamber spark plugs of the internal combustion engine have openings with the same orientation relative to the conduit.

* * * * *